US012603383B2

(12) United States Patent
Janarthanam et al.

(10) Patent No.: US 12,603,383 B2
(45) Date of Patent: Apr. 14, 2026

(54) TRACTION BATTERY PACK VENTING SYSTEMS WITH ENCLOSURE ASSEMBLY INTEGRATED VENT EXHAUST CHANNELS

(71) Applicant: FORD GLOBAL TECHNOLOGIES, LLC, Dearborn, MI (US)

(72) Inventors: Suriyaprakash Ayyangar Janarthanam, Canton, MI (US); Kanchana Perumalla, Troy, MI (US); Mohammadreza Eftekhari, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1024 days.

(21) Appl. No.: 16/951,243

(22) Filed: Nov. 18, 2020

(65) Prior Publication Data

US 2022/0158146 A1 May 19, 2022

(51) Int. Cl.
*H01M 50/358* (2021.01)
*H01M 50/30* (2021.01)
*H01M 50/383* (2021.01)

(52) U.S. Cl.
CPC ......... *H01M 50/358* (2021.01); *H01M 50/30* (2021.01); *H01M 50/383* (2021.01)

(58) Field of Classification Search
CPC ............. H01M 50/20; H01M 2200/20; H01M 50/317; H01M 50/3425; H01M 50/35; H01M 50/367
See application file for complete search history.

(56) References Cited

U.S. PATENT DOCUMENTS

| | | | |
|---|---|---|---|
| 8,361,642 B2 | 1/2013 | Hermann et al. | |
| 2013/0330579 A1* | 12/2013 | Ejiri | H01M 50/572 |
| | | | 429/53 |
| 2015/0069068 A1* | 3/2015 | Hariram | H01M 50/20 |
| | | | 220/560.01 |
| 2015/0093607 A1 | 4/2015 | Kuriyama et al. | |
| 2017/0309878 A1* | 10/2017 | Kepler | H01M 50/367 |
| 2018/0254444 A1* | 9/2018 | Yoon | H01M 50/211 |
| 2019/0173068 A1 | 6/2019 | Kruger | |
| 2020/0152941 A1 | 5/2020 | Wynn et al. | |

FOREIGN PATENT DOCUMENTS

WO 2020/133659 A1 7/2020

* cited by examiner

*Primary Examiner* — Imran Akram
(74) *Attorney, Agent, or Firm* — David B. Kelley; Carlson, Gaskey & Olds, P.C.

(57) ABSTRACT

This disclosure details exemplary traction battery pack designs for use in electrified vehicles. An exemplary traction battery pack may include a venting system having one or more vent exhaust channels. The vent exhaust channels may be integrated with an enclosure assembly of the battery pack for purging battery vent byproducts from the battery pack during cell venting events. In some embodiments, the vent exhaust channels are coated with a thermal protective coating for reducing heat dissipation to surrounding components.

20 Claims, 5 Drawing Sheets

TRACTION BATTERY PACK VENTING SYSTEMS WITH ENCLOSURE ASSEMBLY INTEGRATED VENT EXHAUST CHANNELS

TECHNICAL FIELD

This disclosure relates generally to traction battery packs, and more particularly to battery pack venting systems that include vent exhaust channels that are integrated with an enclosure assembly of the battery pack.

BACKGROUND

Electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that support electric propulsion of electrified vehicles. Battery vent byproducts may be expelled from the battery cells during certain conditions.

SUMMARY

A traction battery pack according to an exemplary aspect of the present disclosure includes, among other things, an enclosure assembly, a battery array housed within the enclosure assembly, and a vent system configured for routing and expelling battery vent byproducts vented by a battery cell of the battery array. The vent system includes a vent exhaust channel fixedly secured to a portion of the enclosure assembly.

In a further non-limiting embodiment of the foregoing traction battery pack, the vent exhaust channel is fixedly secured to an interior surface of a cover of the enclosure assembly.

In a further non-limiting embodiment of either of the foregoing traction battery packs, the vent exhaust channel is fixedly secured to an interior surface of a tray of the enclosure assembly.

In a further non-limiting embodiment of any of the foregoing traction battery packs, the vent exhaust channel is arranged over a vent port of the battery cell.

In a further non-limiting embodiment of any of the foregoing traction battery packs, the vent exhaust channel is fluidly connected to a vent device configured to expel the battery vent byproducts from the traction battery pack.

In a further non-limiting embodiment of any of the foregoing traction battery packs, a vent tube fluidly connects the vent exhaust channel to the vent device.

In a further non-limiting embodiment of any of the foregoing traction battery packs, the vent device is a one-way valve located at least partially outside of the enclosure assembly, and the vent tube extends through either a cover or a tray of the enclosure assembly.

In a further non-limiting embodiment of any of the foregoing traction battery packs, an interior surface of the vent exhaust channel is coated with a thermal protective coating.

In a further non-limiting embodiment of any of the foregoing traction battery packs, the thermal protective coating includes an intumescent fireproof coating.

In a further non-limiting embodiment of any of the foregoing traction battery packs, the thermal protective coating includes a ceramic based coating.

In a further non-limiting embodiment of any of the foregoing traction battery packs, the thermal protective coating includes a Sipiol® water-based coating.

A traction battery pack according to another exemplary aspect of the present disclosure includes, among other things, an enclosure assembly, a battery array housed within the enclosure assembly, and a vent system configured for routing and expelling battery vent byproducts vented by a battery cell of the battery array. The vent system includes a vent exhaust channel that includes a thermal protective coating.

In a further non-limiting embodiment of the foregoing traction battery pack, the thermal protective coating includes an intumescent fireproof coating.

In a further non-limiting embodiment of either of the foregoing traction battery packs, the thermal protective coating includes a ceramic based coating.

In a further non-limiting embodiment of any of the foregoing traction battery packs, the thermal protective coating includes a Sipiol® water-based coating.

In a further non-limiting embodiment of any of the foregoing traction battery packs, the thermal protective coating is applied to an interior surface of the vent exhaust channel.

In a further non-limiting embodiment of any of the foregoing traction battery packs, the vent exhaust channel is arranged over a vent port of the battery cell, and a seal is disposed within a gap between the battery array and the vent exhaust channel.

In a further non-limiting embodiment of any of the foregoing traction battery packs, the vent exhaust channel is fixedly secured to a portion of the enclosure assembly.

In a further non-limiting embodiment of any of the foregoing traction battery packs, the vent exhaust channel is fixedly secured to an interior surface of a cover or a tray of the enclosure assembly.

In a further non-limiting embodiment of any of the foregoing traction battery packs, the vent exhaust channel is fluidly connected to a vent device configured to expel the battery bent byproducts from the traction battery pack. At least a portion of the vent device is located outside of the enclosure assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include a venting system having one or more vent exhaust channels. The vent exhaust channels may be integrated with an enclosure assembly of the battery pack for purging battery vent byproducts from the battery pack during cell venting events. In some embodiments, the vent exhaust channels are coated with a thermal protective coating for reducing heat dissipation to surrounding components. These and other features are discussed in greater detail in the following paragraphs of this detailed description.

Figure 1:
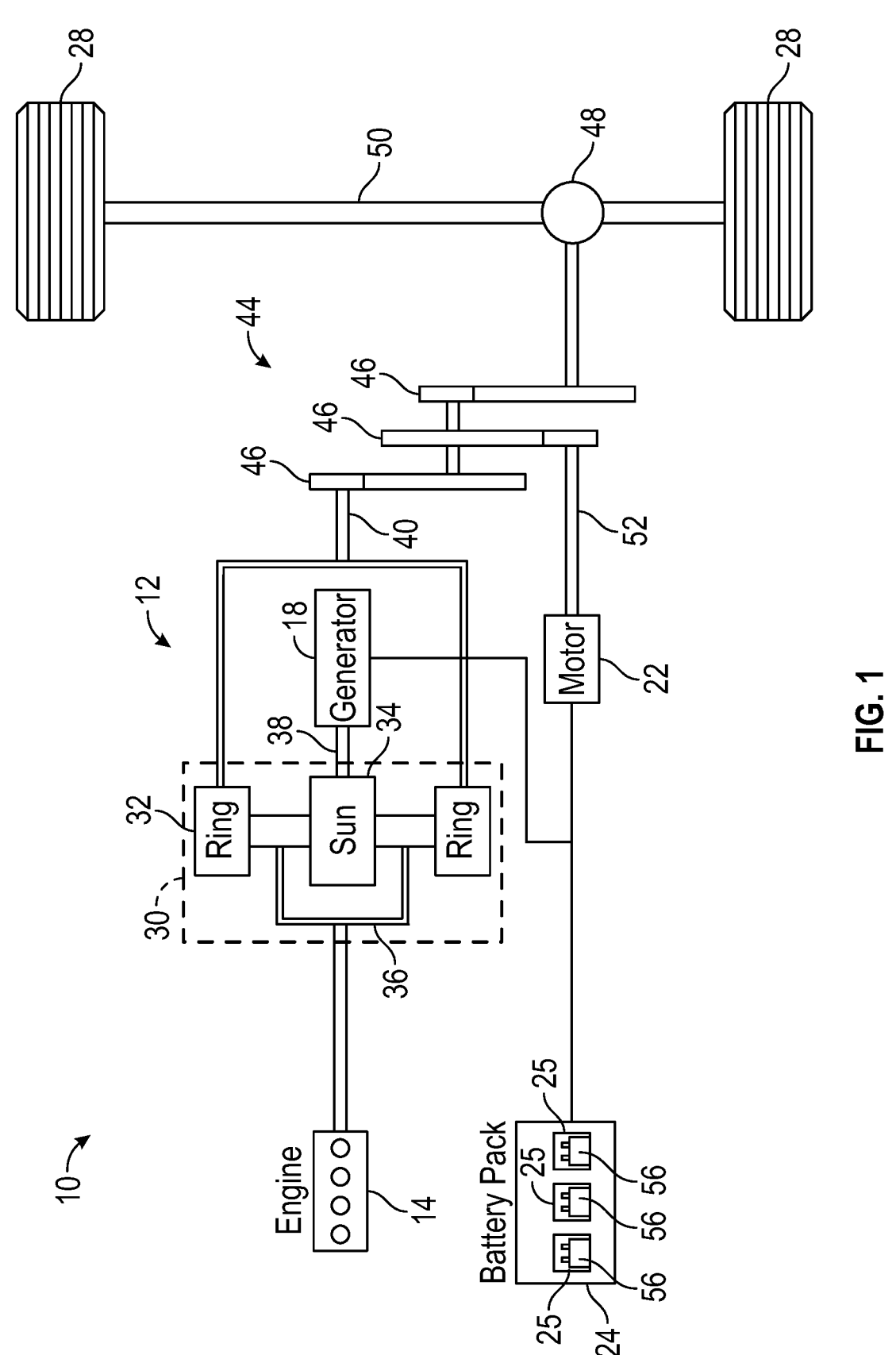
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

Figure 2:
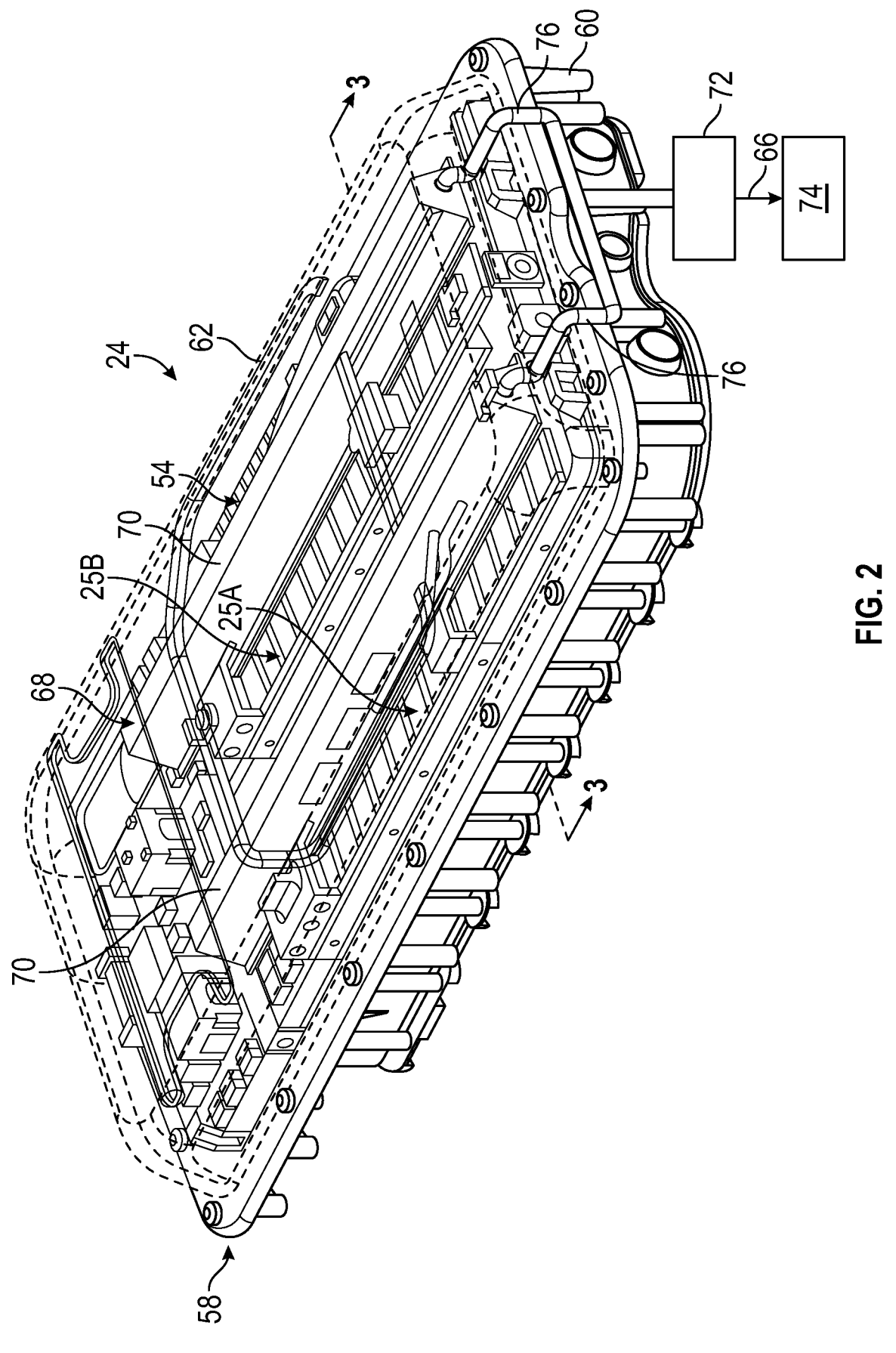
FIG. 2 illustrates a battery pack of an electrified vehicle.
Figure 3:
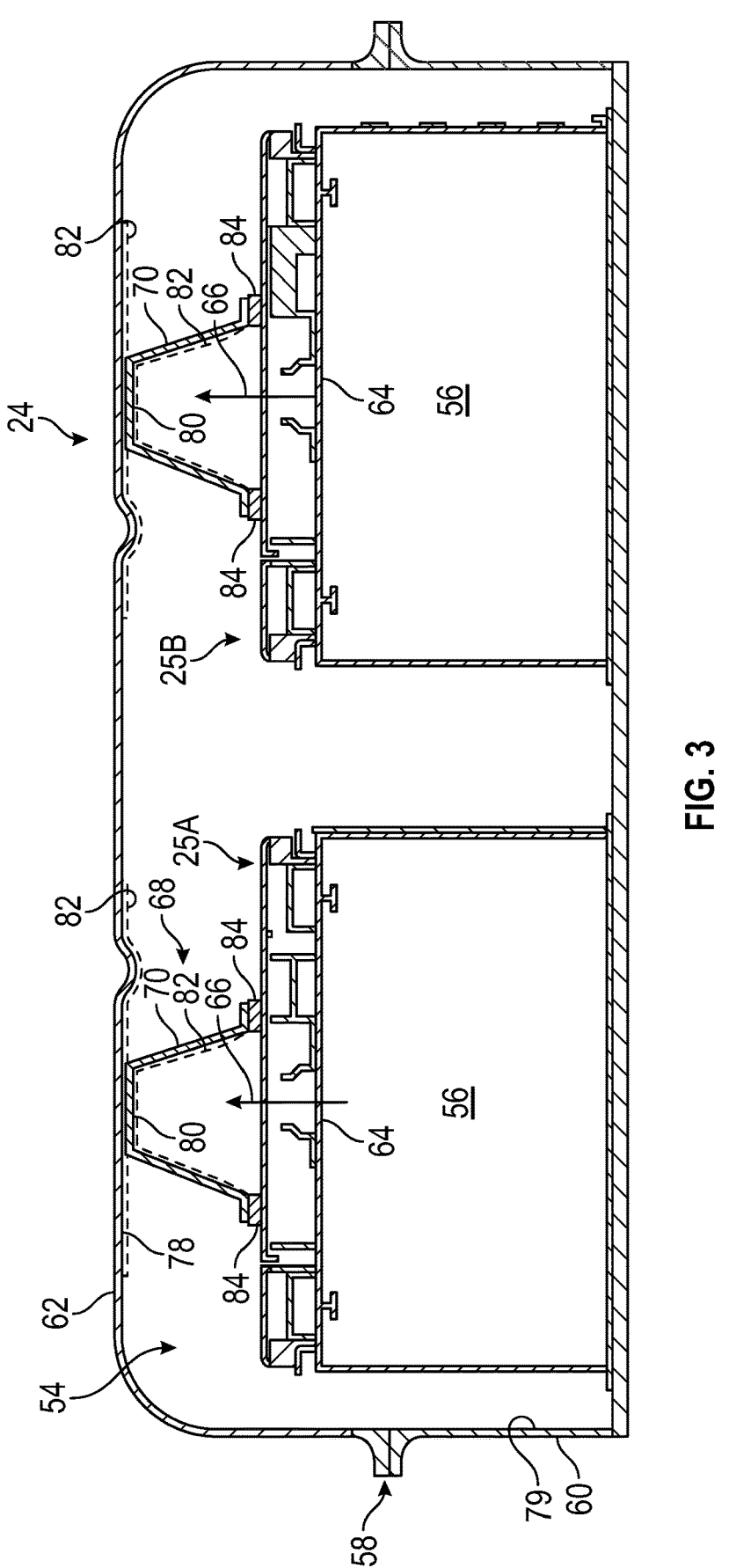
FIG. 3 is a cross-sectional view through section 3-3 of FIG. 2 and illustrates an exemplary venting system of the battery pack.

FIGS. 2 and 3 schematically illustrate a traction battery pack 24 that can be employed within an electrified vehicle. For example, the traction battery pack 24 could be incorporated as part of the powertrain 10 of the electrified vehicle 12 of FIG. 1 or within any other electrified powertrain. FIG. 2 is an assembled, perspective view of the traction battery pack 24, and FIG. 3 is a cross-sectional view through section 3-3 of FIG. 2.

The traction battery pack 24 may include a battery system 54 and an enclosure assembly 58. The battery system 54, along with various other battery electronic components, may be housed inside the enclosure assembly 58. The enclosure assembly 58 may be a sealed enclosure that includes a tray 60 and a cover 62 and may embody any size, shape, and configuration within the scope of this disclosure. For example, the enclosure assembly 58 could be rectangular, triangular, round, irregular, etc. The enclosure assembly 58 may be constructed of metallic materials, polymer-based materials, textile materials, or any combination of these materials.

[own] The cover 62 of the enclosure assembly 58 is shown in phantom in FIG. 2 to better illustrate the battery system 54. The battery system 54 of the traction battery pack 24 includes a plurality of battery cells 56 (see FIG. 3) that store energy for powering various electrical loads of the electrified vehicle 12. The battery system 54 could include any number of battery cells within the scope of this disclosure. Therefore, this disclosure is not limited to the exact battery system configuration shown in FIGS. 2-3.

The battery cells 56 may be stacked side-by-side to construct a grouping of battery cells 56, sometimes referred to as a battery array. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery system 54 depicted in FIGS. 2-3 includes a first battery array 25A and a second battery array 25B. Although the battery system 54 is depicted as including two battery arrays, the traction battery pack 24 could include a greater or fewer number of battery arrays and still fall within the scope of this disclosure. Unless stated otherwise herein, when used without any alphabetic identifier immediately following the reference numeral, reference numeral "25" may refer to any of the battery arrays of the traction battery pack 24.

The battery cells 56 of the first battery array 25A may be distributed along a first longitudinal axis and the battery cells 56 of the second battery array 25B may distributed along a second longitudinal axis that is laterally adjacent to the first longitudinal axis. Thus, the first and second battery arrays 25A, 25B may extend in parallel with one another inside the enclosure assembly 58.

Each battery cell 56 of the traction battery pack 24 may include one or more vent ports 64 (best illustrated in FIG. 3). The vent ports 64 are configured to expel battery vent byproducts 66, such as gases or other byproducts, from the battery cells 56 during certain battery venting events. For example, battery venting events may occur during over-temperature, over-charging, or over-discharging conditions of the battery cells 56, or during other cell conditions.

The traction battery pack 24 may be equipped with a venting system 68 that is configured for routing and discharging the battery vent byproducts 66 from the interior of the traction battery pack 24 to a location external to the battery pack 24 while preventing environmental elements (e.g., air, moisture, insects, etc.) from entering the battery pack 24 through the venting system 68. The venting system 68 may include one or more vent exhaust channels 70 for routing the battery vent byproducts 66 along a venting path away from the interior of the traction battery pack 24, and a vent device 72 for purging the battery vent byproducts 66 from the traction battery pack 24 when a battery cell venting event occurs, thereby reducing or preventing thermal expansion and significant pressure increases inside the battery pack 24.

The battery vent byproducts 66 may flow, under their own motive pressure, through each vent exhaust channel 70 and then through the vent device 72 prior to being expelled outside of the battery pack 24, such as to atmosphere 74 (i.e., outside the vehicle). The vent exhaust channels 70 may be fluidly connected to the vent device 72 by one or more vent tubes 76. In an embodiment, the vent tubes 76 extend through the enclosure assembly 58 (e.g., through the cover 62 or the tray 60) for connecting to the vent device 72 at a location outside of the traction battery pack 24 (see FIG. 2). Portions of the vent device 72 may be mounted to the exterior of the traction battery pack 24.

The vent device 72 permits the battery vent byproducts 66 to flow out of the traction battery pack 24 to the atmosphere 74. In an embodiment, the vent device 72 is a one-way valve that is configured to block environmental elements from being communicated along a reverse path from the atmosphere 74 into the vent tubes 76/vent exhaust channels 70. Moisture/humidity of the atmospheric air, insects and other elements associated with the atmosphere 74 are undesirable inside the traction battery pack 24 and may thus be blocked from ingress by the vent device 72.

Each vent exhaust channel 70 of the venting system 68 may be a metallic or polymeric component that is integrated with a portion of the enclosure assembly 58 of the traction battery pack 24. For example, the vent exhaust channels 70 may be fixedly secured to portions of the enclosure assembly 58. In an embodiment, the vent exhaust channels 70 are welded to the enclosure assembly 58. In another embodiment, the vent exhaust channels 70 are adhesively bonded to the enclosure assembly 58. In yet another embodiment, the vent exhaust channels 70 are integrally formed (e.g., over-molded) with the enclosure assembly 58, such as for polymer based enclosure assemblies, for example. The overall size and shape of each vent exhaust channel 70 is not intended to limit this disclosure.

In an embodiment, the vent exhaust channels 70 are fixedly secured to an interior surface 78 of the cover 62 of the enclosure assembly 58 (see FIG. 3). In another embodiment, the vent exhaust channels 70 are fixedly secured to an interior surface 79 of the tray 60 of the enclosure assembly 58 (see FIG. 4), such as for a side-oriented battery array, for example.

One or more of the vent exhaust channels 70 may be arranged in abutting contact with each battery array 25 of the traction battery pack 24. The vent exhaust channels 70 may be positioned to cover the vent ports 64 of the battery cells 56 of the battery arrays 25. One or more seals 84 may be disposed between the battery arrays 25 and the vent exhaust channels 70 for sealing any gaps therebetween. The seals 84 are foam strip seals, in an embodiment. However, the seals 84 could alternatively be plastic seals, metals seals, composite seals, etc.

An interior surface 80 of each vent exhaust channel 70 may be coated with a thermal protective coating 82. The thermal protective coating 82 is designed to prevent damage to the vent exhaust channels 70 and reduce heat dissipation to surrounding components of the traction battery pack 24. Portions of the interior surface 78 of the cover 62 and/or the interior surface 79 of the tray 60 could additionally be coated with the thermal protective coating 82.

In an embodiment, the thermal protective coating 82 is an intumescent fireproof coating. In another embodiment, the thermal protective coating 82 is a ceramic based coating, such as Omega Fire™ sold by Superior Products International II, Inc. In yet another embodiment, the thermal protective coating 82 is a Sipiol® water-based coating. Oher thermal protective coatings may also be suitable within the scope of this disclosure. Therefore, the thickness and density of the thermal protective coating is not intended to limit this disclosure.

Figure 5A:
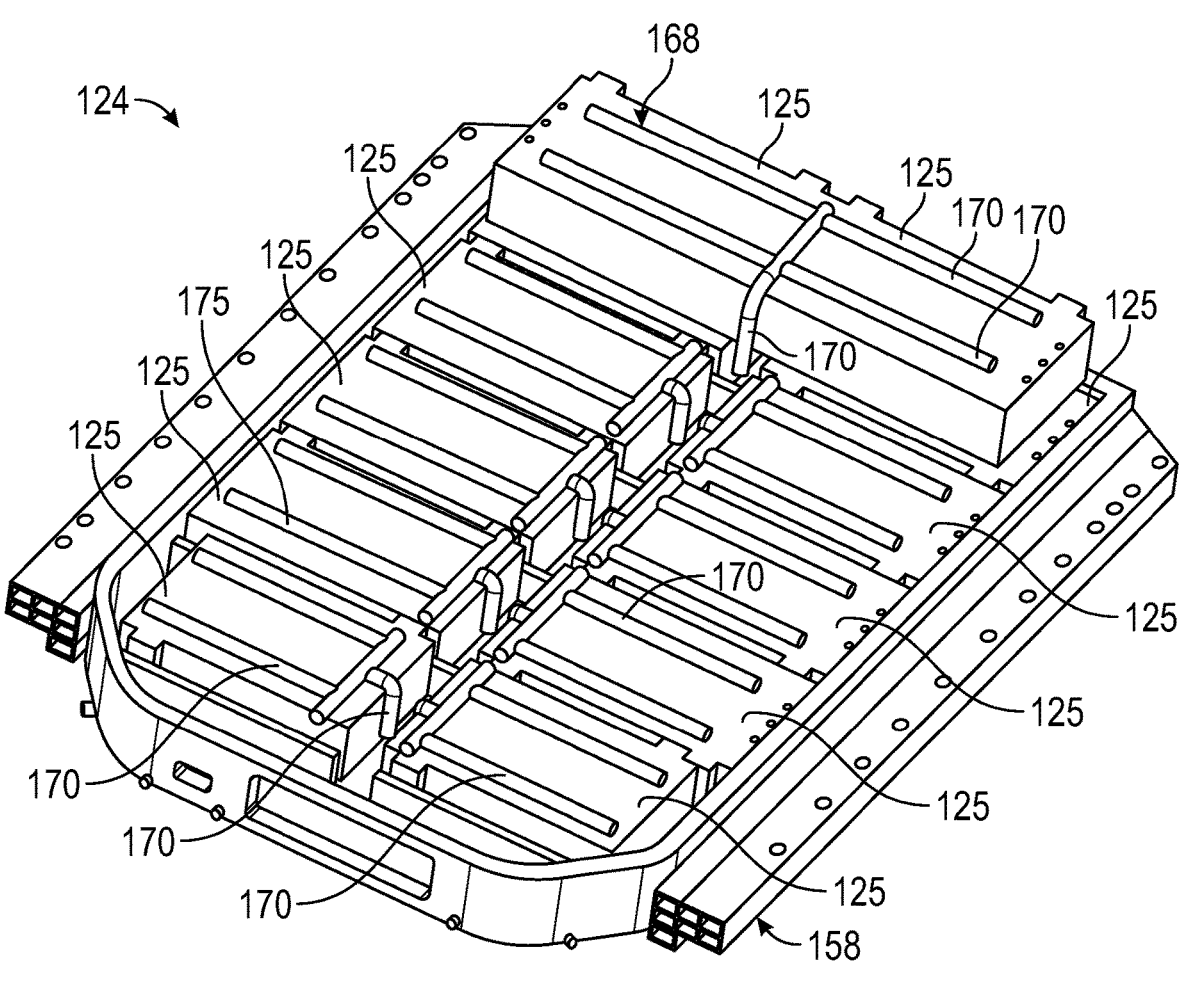
FIGS. 5A and 5B illustrate venting system features associated with another exemplary battery pack.
Figure 5B:
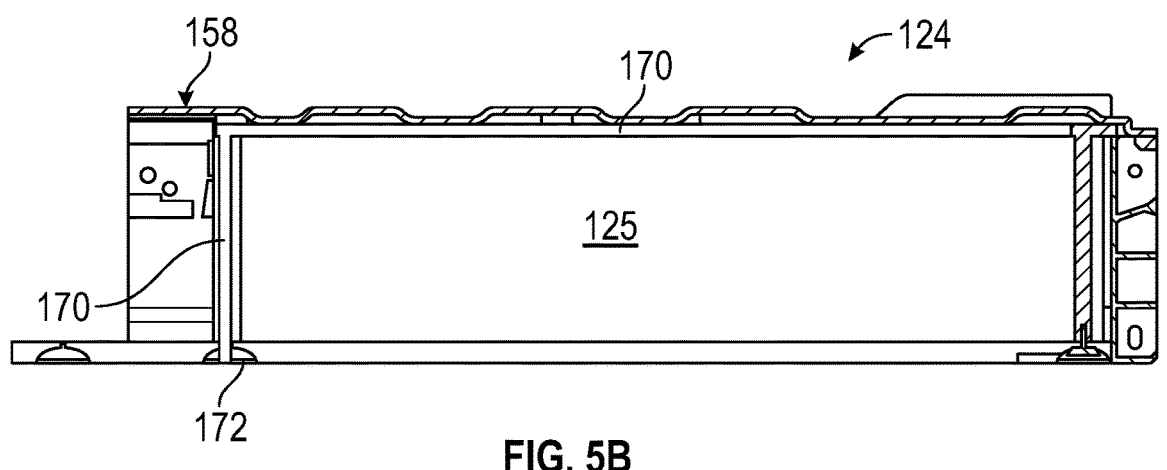

FIGS. 5A and 5B illustrate a traction battery pack 124 that includes a plurality of battery arrays 125. Although a total of twelve battery arrays are shown in this embodiment, the total number of battery arrays 125 provided within the traction battery pack 124 is not intended to limit this disclosure.

The traction battery pack 124 is equipped with a vent system 168 for purging battery vent byproducts from the interior of the traction battery pack 124 during battery venting events. The vent system 168 may include one or more vent exhaust channels 170. In an embodiment, the vent exhaust channels 170 are arranged along both a top and a side of each of the battery arrays 125. The vent exhaust channels 170 associated with each battery array 125 may be connected to a vent device 172 (e.g., a one-way valve) for allowing battery vent byproducts to flow in a first direction while preventing environmental elements from being communicated in a reverse direction. Thus, in this embodiment, at least one dedicated vent device 172 is provided for expelling battery vent byproducts from each battery array 125.

Figure 4:
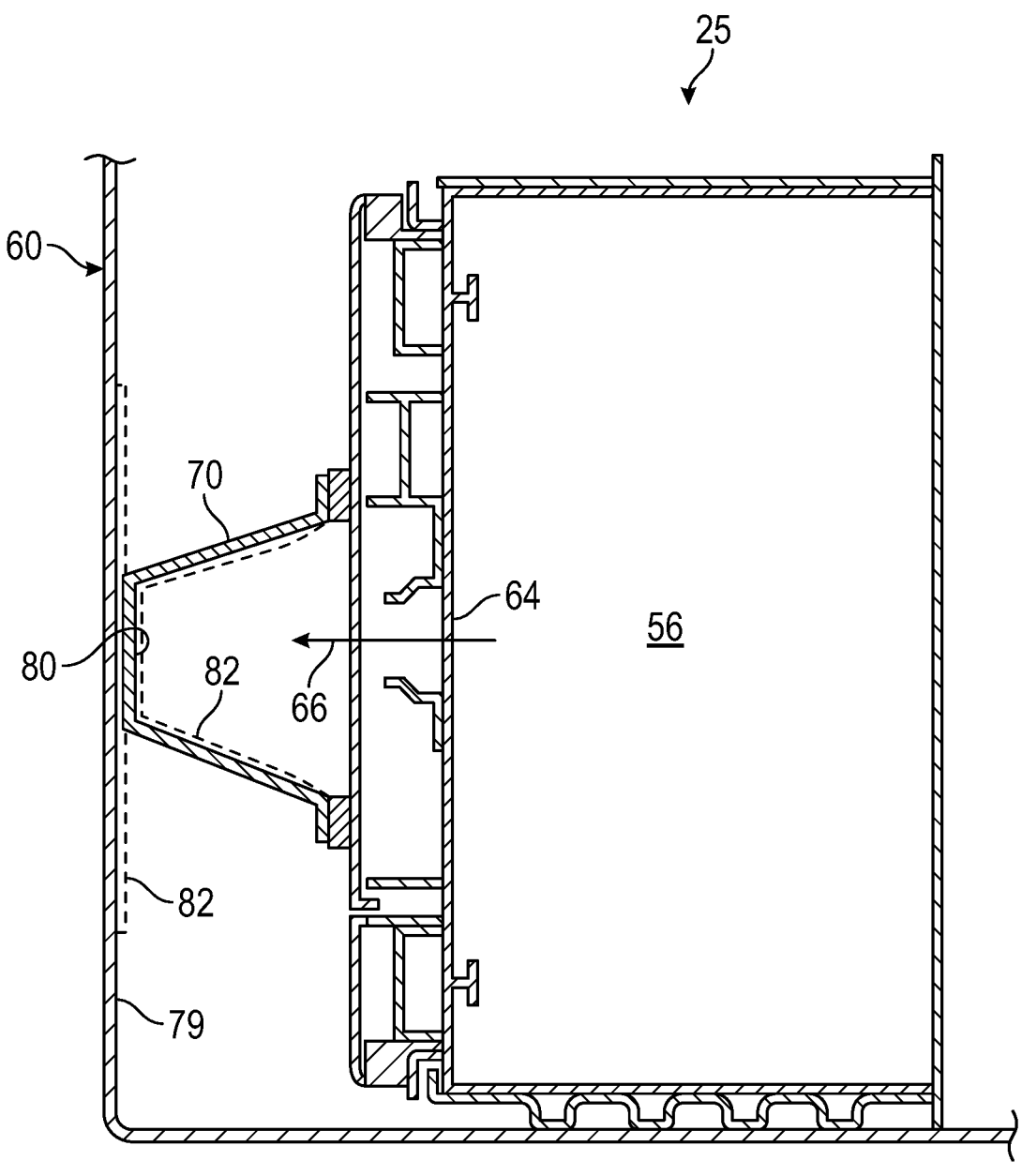
FIG. 4 illustrates another exemplary venting system of a battery pack.

Like the embodiment of FIGS. 2-4, the vent exhaust channels 170 may be fixedly secured to portions of an enclosure assembly 158 of the traction battery pack 124 and may also be coated with a suitable thermal protective coating for reducing heat dissipation during cell venting events.

The exemplary traction battery packs of this disclosure incorporate venting systems for purging battery vent byproducts and thus preventing or significantly reducing thermal propagation and thermal expansion inside the pack interior. The exemplary venting system designs provide a secure and cost effective solution for routing and expelling battery vent byproducts from the battery pack interior.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an enclosure assembly that provides an outermost surface of the traction battery pack;
a battery array housed within the enclosure assembly and including a plurality of battery cells stacked side-by-side; and
a vent system configured for routing and expelling battery vent byproducts vented by a battery cell of the plurality of battery cells of the battery array,
wherein the vent system includes a vent exhaust channel fixedly secured directly to a portion of the enclosure assembly.

2. The traction battery pack as recited in claim 1, wherein the vent exhaust channel is fixedly secured directly to an interior surface of a cover of the enclosure assembly.

3. The traction battery pack as recited in claim 1, wherein the vent exhaust channel is fixedly secured to directly an interior surface of a tray of the enclosure assembly.

4. The traction battery pack as recited in claim 1, wherein the vent exhaust channel is arranged over a vent port of the battery cell.

5. The traction battery pack as recited in claim 1, wherein the vent exhaust channel is fluidly connected to a vent device configured to expel the battery vent byproducts from the traction battery pack, and comprising a vent tube that fluidly connects the vent exhaust channel to the vent device.

6. The traction battery pack as recited in claim 5, wherein the vent device is a one-way valve located at least partially outside of the enclosure assembly, and the vent tube extends through either a cover or a tray of the enclosure assembly.

7. The traction battery pack as recited in claim 1, wherein an interior surface of the vent exhaust channel is coated with a thermal protective coating.

8. The traction battery pack as recited in claim 7, wherein the thermal protective coating includes an intumescent fireproof coating or a ceramic base coating.

9. The traction battery pack as recited in claim 7, wherein the thermal protective coating includes a curable, water-based coating.

10. The traction battery pack as recited in claim 1, wherein a first portion of the vent exhaust channel is fixedly secured directly to an interior surface of a cover or a tray of the enclosure assembly, and a second portion of the vent exhaust channel is received in abutting contact with a seal that is disposed between the vent exhaust channel and a housing of the battery cell.

11. A traction battery pack, comprising:
an enclosure assembly that provides an outermost surface of the traction battery pack;
a battery array housed within the enclosure assembly and including a plurality of battery cells stacked side-by-side; and
a vent system configured for routing and expelling battery vent byproducts vented by a battery cell of the plurality of battery cells of the battery array,
wherein the vent system comprises a vent exhaust channel that includes a thermal protective coating,
wherein the vent exhaust channel is fixedly secured directly to a portion of the enclosure assembly.

12. The traction battery pack as recited in claim 11, wherein the thermal protective coating includes an intumescent fireproof coating.

13. The traction battery pack as recited in claim 11, wherein the thermal protective coating includes a ceramic based coating.

14. The traction battery pack as recited in claim 11, wherein the thermal protective coating includes a curable, water-based coating.

15. The traction battery pack as recited in claim 11, wherein the thermal protective coating is applied to an interior surface of the vent exhaust channel.

16. The traction battery pack as recited in claim 11, wherein the vent exhaust channel is arranged over a vent port of the battery cell, and further comprising a seal disposed within a gap between the battery array and the vent exhaust channel.

17. The traction battery pack as recited in claim 11, wherein the vent exhaust channel is fixedly secured directly to an interior surface of a cover or a tray of the enclosure assembly.

18. The traction battery pack as recited in claim 17, wherein the vent exhaust channel is fixedly secured to the interior surface by a weld or an adhesive.

19. The traction battery pack as recited in claim 11, wherein the vent exhaust channel is fluidly connected to a vent device configured to expel the battery byent byproducts from the traction battery pack, and further wherein at least a portion of the vent device is located outside of the enclosure assembly.

20. The traction battery pack as recited in claim 11, wherein at least a portion of an interior surface of a cover or a tray of the enclosure assembly includes the thermal protective coating.

* * * * *